(12) United States Patent
Meloche et al.

(10) Patent No.: US 8,837,085 B2
(45) Date of Patent: Sep. 16, 2014

(54) WRITE YOKE WITH STABILIZING LAYER

(75) Inventors: Eric Roger Meloche, Burnsville, MN (US); Eric Linville, Shakopee, MN (US); Jianhua Xue, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/437,436

(22) Filed: Apr. 2, 2012

(65) Prior Publication Data

US 2013/0258525 A1    Oct. 3, 2013

(51) Int. Cl.
*G11B 5/127* (2006.01)
*G11B 5/147* (2006.01)

(52) U.S. Cl.
USPC ................................ 360/125.28; 360/125.06

(58) Field of Classification Search
USPC ............. 360/125.03, 125.12, 125.14, 125.15, 360/125.27–125.29, 125.35–125.37, 360/125.67–125.7, 125.24, 125.26–125.3
See application file for complete search history.

(56) References Cited

U.S. PATENT DOCUMENTS

| 5,379,172 | A | | 1/1995 | Liao | |
|---|---|---|---|---|---|
| 5,452,164 | A | * | 9/1995 | Cole et al. | 360/317 |
| 5,655,286 | A | * | 8/1997 | Jones, Jr. | 29/603.13 |
| 5,680,283 | A | * | 10/1997 | Tanaka et al. | 360/125.03 |
| 6,185,081 | B1 | | 2/2001 | Simion et al. | |
| 6,198,597 | B1 | * | 3/2001 | Tateyama et al. | 360/125.5 |
| 6,233,166 | B1 | | 5/2001 | Tarodo | |
| 6,683,748 | B2 | * | 1/2004 | Kim et al. | 360/125.13 |
| 7,070,716 | B2 | | 7/2006 | Lam | |
| 7,199,975 | B1 | | 4/2007 | Pan | |
| 7,359,146 | B2 | | 4/2008 | Hirata et al. | |
| 7,554,765 | B2 | * | 6/2009 | Shukh et al. | 360/125.12 |
| 7,777,989 | B2 | | 8/2010 | Sun et al. | |
| 7,852,603 | B2 | | 12/2010 | Kobayashi et al. | |
| 8,045,291 | B2 | | 10/2011 | Kobayashi et al. | |
| 8,059,366 | B2 | | 11/2011 | Takano et al. | |
| 2002/0036872 | A1 | * | 3/2002 | Hiramoto et al. | 360/321 |
| 2004/0120074 | A1 | * | 6/2004 | Okada et al. | 360/126 |
| 2004/0252415 | A1 | * | 12/2004 | Shukh et al. | 360/317 |
| 2004/0257712 | A1 | * | 12/2004 | Hiramoto et al. | 360/321 |
| 2006/0103982 | A1 | * | 5/2006 | Nakamoto et al. | 360/126 |
| 2007/0097546 | A1 | * | 5/2007 | Li et al. | 360/125 |
| 2007/0195455 | A1 | * | 8/2007 | Kobayashi et al. | 360/126 |
| 2008/0266721 | A1 | * | 10/2008 | Kameda | 360/314 |
| 2009/0154021 | A1 | * | 6/2009 | Nunokawa et al. | 360/234.3 |
| 2010/0188775 | A1 | | 7/2010 | Macken et al. | |
| 2012/0147503 | A1 | * | 6/2012 | Zou et al. | 360/125.41 |

FOREIGN PATENT DOCUMENTS

| JP | 2005-038535 A | 2/2005 |
|---|---|---|
| JP | 2005-174449 A | 6/2005 |
| JP | 2005-209244 A | 8/2005 |
| JP | 2006-209818 A | 8/2006 |

* cited by examiner

*Primary Examiner* — Adam B Dravininkas
(74) *Attorney, Agent, or Firm* — Hall Estill Attorneys at Law

(57) ABSTRACT

An apparatus is provided that generally relates to a data writer that may be constructed with a write pole coupled to a yoke. The yoke may be configured with a stabilizing layer that stabilizes magnetic domains present in the yoke. In some embodiments, the yoke has first and second sub-yokes.

20 Claims, 5 Drawing Sheets

WRITE YOKE WITH STABILIZING LAYER

SUMMARY

Various embodiments of the present disclosure are generally directed to a magnetic data writer that is capable of enhanced data recording through magnetic domain control.

In accordance with various embodiments, a data writer may be constructed with a write pole coupled to a yoke. The yoke may be configured with a stabilizing layer that stabilizes magnetic domains present in the yoke.

DETAILED DESCRIPTION

As industry demand for data storage devices with higher data capacity and data transfer rates increases, the size of data bits and speed of data programming are stretched to magnetic and structural limits. For example, when residual magnetic flux is present after a data bit is programmed, an erase after write (EAW) situation may occur as an unpowered magnetic data writer emits flux that inadvertently affects adjacent data bits. Elevated instances of EAW, especially in reduced form factor data storage devices, can reduce data access reliability and increase data access time. Without structural control of EAW, industry cannot provide data storage devices capable of achieving data access operation in heightened data bit density environments.

Consequently, a data writer may be constructed with a write pole coupled to a yoke that is configured with a stabilizing layer that stabilizes magnetic domains present in the yoke. Magnetic control of large magnetically soft materials, like those used in data access elements, becomes challenging due to a host of factors that may include at least, elevated heat and data writing cycles. Specifically, the retention of magnetization in a data writer immediately after data programming can be challenging due at least in part to the large magnetic flux produced by modern writer coils and the high energy configurations of data writing components, such as the write pole and yoke.

Although most data writers will eventually relax to an energy minimized Landau closure domain state, magnetic domains may linger in the data writing components for extended periods, which can generate unwanted metastable magnetic states that can affect data writing speed and reliability. The use of at least one stabilizing layer on data writing components can reduce the risk of unwanted magnetic domain configurations by manipulating the energy landscape through tuned shape anisotropy and magnetic material selection.

Figure 1:
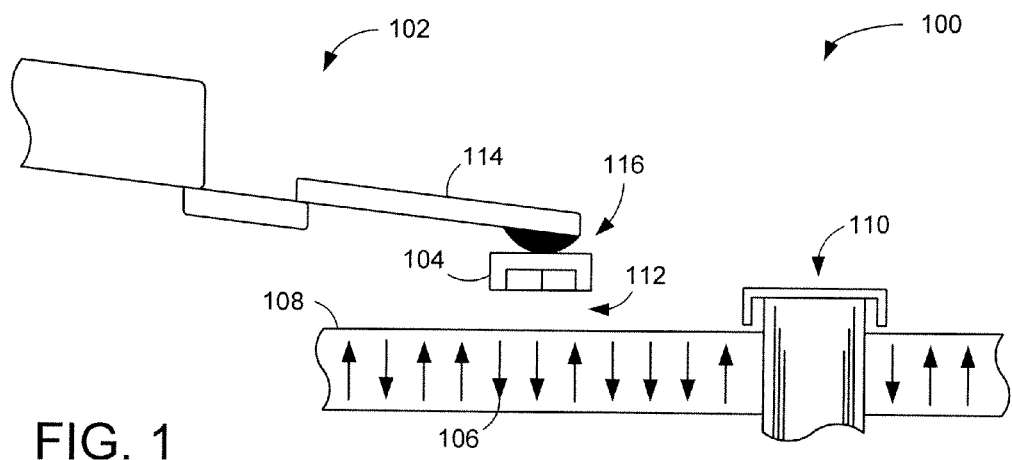
FIG. 1 is a block representation of an example portion of a data storage device.

FIG. 1 generally illustrates an example data transducing portion 100 of a data storage device. The transducing portion 100 is shown in an environment in which various embodiments of the present technology can be advantageously practiced. It will be understood, however, that the various embodiments of this disclosure are not so limited by such environment and can be implemented in a variety of different data storage devices to control magnetic domains and alleviate inadvertent magnetic flux generation conditions, such as EAW.

The transducing portion 100 is constructed with an actuating assembly 102 that positions a transducing head 104 over programmed data bits 106 present on a magnetic storage media 108. The storage media 108 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 108.

The transducing head 104 can include one or more transducing elements, such as a magnetic writer and magnetically responsive reader, which operate to program and read data from the storage media 108, respectively. In this way, controlled motion of the actuating assembly 102 induces the transducers to align with data tracks (not shown) defined on the storage media surfaces to write, read, and rewrite data.

Figure 2:
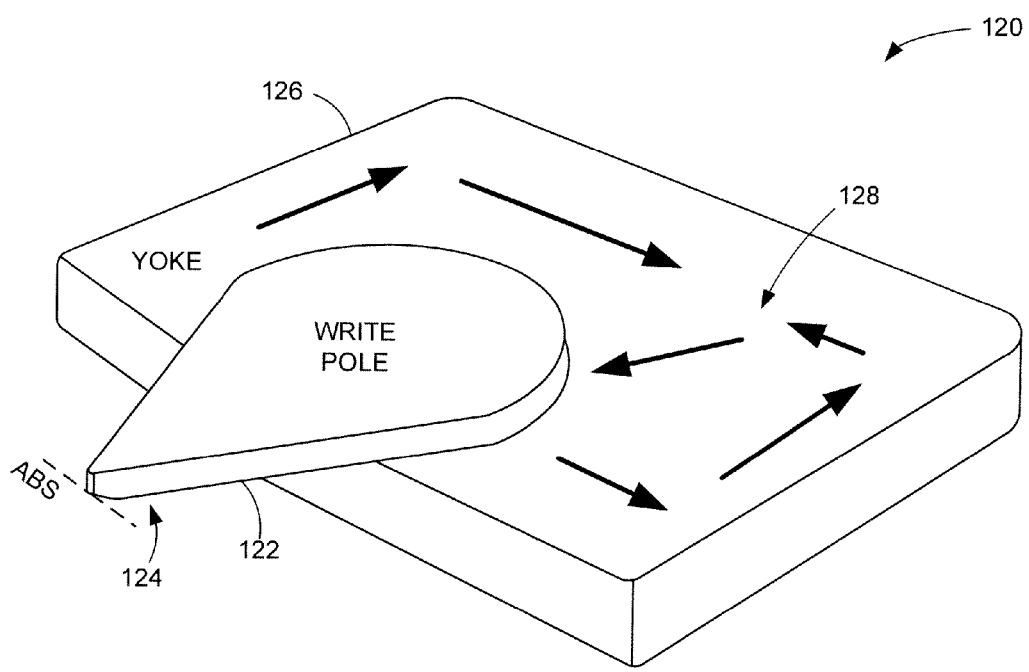
FIG. 2 provides an example data writing element capable of being used in the portion of the data storage device displayed in FIG. 1.

FIG. 2 displays an isometric view of an example magnetic data writer 120 capable of being used in the transducing head 104 of FIG. 1. The data writer 120 can have one or more magnetically conductive poles that act to pass magnetic flux through an adjacent data storage media in predetermined directions. One such pole can be configured like the write pole 122 with a relatively large girth distal an ABS tapering to a reduced width pole tip 124 to focus magnetic flux to a particular region of the adjacent data storage media.

While the write pole 122 can be configured in any number of unlimited sizes, shapes, and orientations to funnel magnetization, the write pole 122 can be coupled to a yoke 126 that is adapted to provide the write pole 122 with magnetization from a write coil (not shown). The yoke 126, as shown, can be constructed to be physically larger than the write pole 122, which can aid in sufficiently supplying magnetic flux to the write pole tip 124. However, a wide yoke 126 can provide ample surface area for magnetic domains to get trapped in metastable states, as generally illustrated by region 128.

Figure 3A:
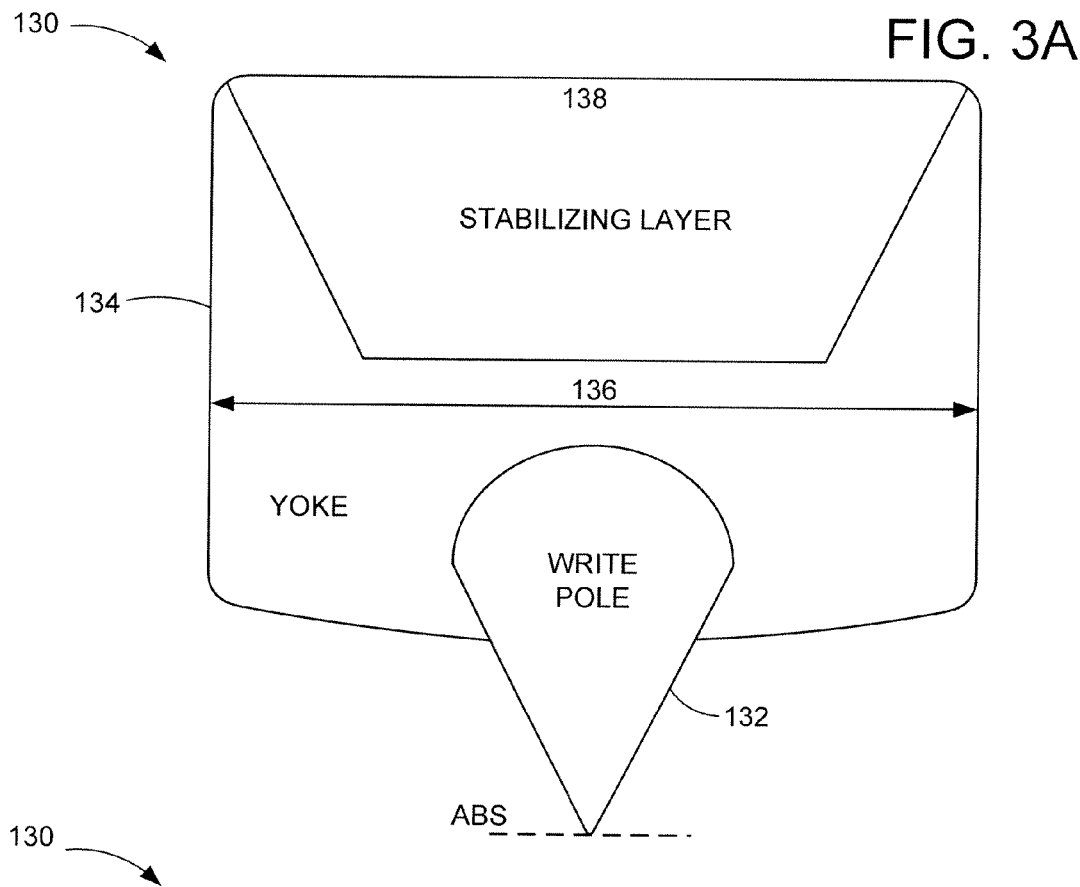
FIGS. 3A and 3B show top views of an example magnetic writing element.
Figure 3B:
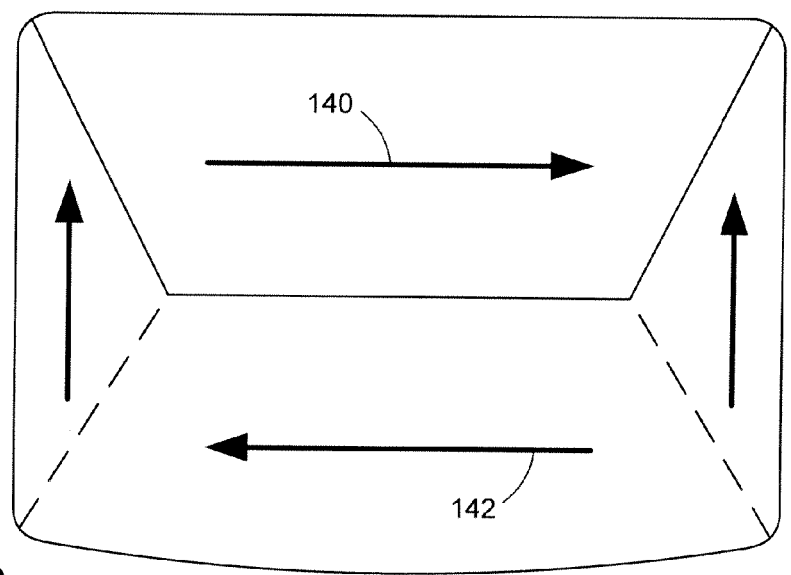

FIGS. 3A and 3B respectively provide top views of a portion of a data writer 130 constructed to stabilize magnetic domains and eliminate metastable states. As shown in FIG. 3A, a write pole 132 is connected to a yoke 134 that is configured with a predetermined width 136, as measured parallel to the ABS, that is greater than the width of the write pole 132. The yoke 134 may develop a plurality of magnetic domains that can become unstable, especially immediately after a data programming cycle.

To alleviate such instability, a stabilizing layer 138 can be positioned on the yoke 134 to provide a pinned magnetization 140, as displayed in FIG. 3B, that exchange couple to the yoke 134 material and aid in making a Landau closure domain energetically more favorable. The shape, size, position, and material of the stabilization layer 138 can be tuned to provide a predetermined amount of hard magnetization to the yoke 134 to promote magnetic domain closure. The use of shape anisotropy by configuring the stabilization layer 138 as a trapezoid, as shown, can be chosen during tuning to be combined with forming the stabilization layer 138 of a permanent magnet to generate a pinned magnetization 140 that can more quickly relax native magnetizations 142 of the yoke 134 after a data bit programming cycle.

In some embodiments, the stabilization layer 138 is tuned to be other shapes, such as a rectangle and rhombus, while antiferromagnetic material is used to form the stabilization layer 138 and exchange couple with the yoke 134. Regardless of the tuned configuration of the stabilization layer 138, the chirality of the closure domains, as shown in FIG. 3B, is set by the pinned magnetization 140 and prevents rogue magnetizations from developing into metastable states.

Figure 4:
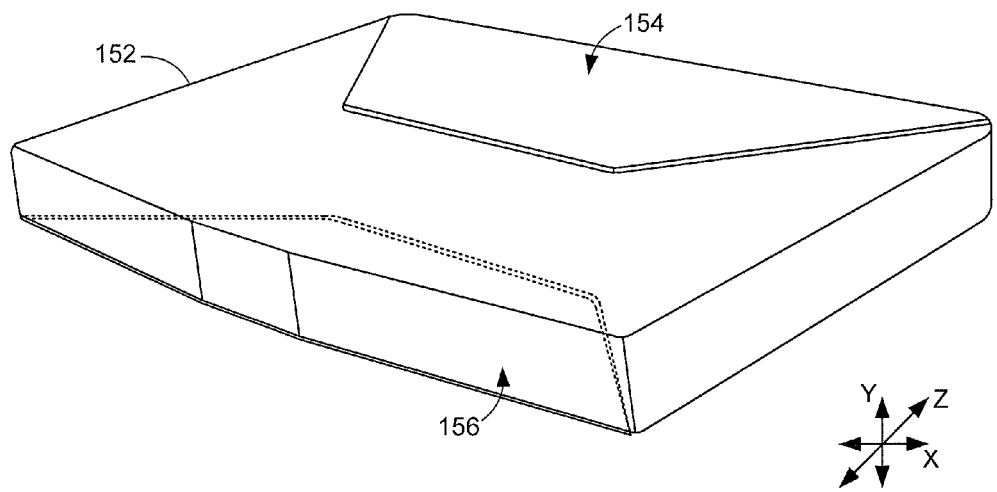
FIG. 4 displays an isometric view of an example magnetic writing elements constructed in accordance with various embodiments.

FIG. 4 displays an isometric view of an example data write yoke 150 constructed in accordance with various embodiments. The yoke 150 has a single continuous body 152 that has first and second stabilization layers 154 and 156 positioned on opposite sides of the body 152. As shown, the first and second stabilization layers 154 and 156 are placed on opposite sides of yoke body 152 with respect to both the vertical axis, Y axis, and the transverse axis, Z axis.

While not required or limited, the first and second stabilization layers 154 and 156 may be formed individually or commonly tuned to provide the same or different pinned magnetizations adapted to promote closed magnetic domains. That is, the first stabilization layer 154 can be shaped as a trapezoid, be formed as a permanent magnet, and have a magnetization flowing in a first direction while the second stabilization layer 156 may be a rectangle, be constructed as an antiferromagnet and have a magnetization flowing in a second direction, different from the first direction. Such configurability allows for the stabilization of magnetic components with a variety of shapes, sizes, and numbers of magnet domains.

Figure 5:
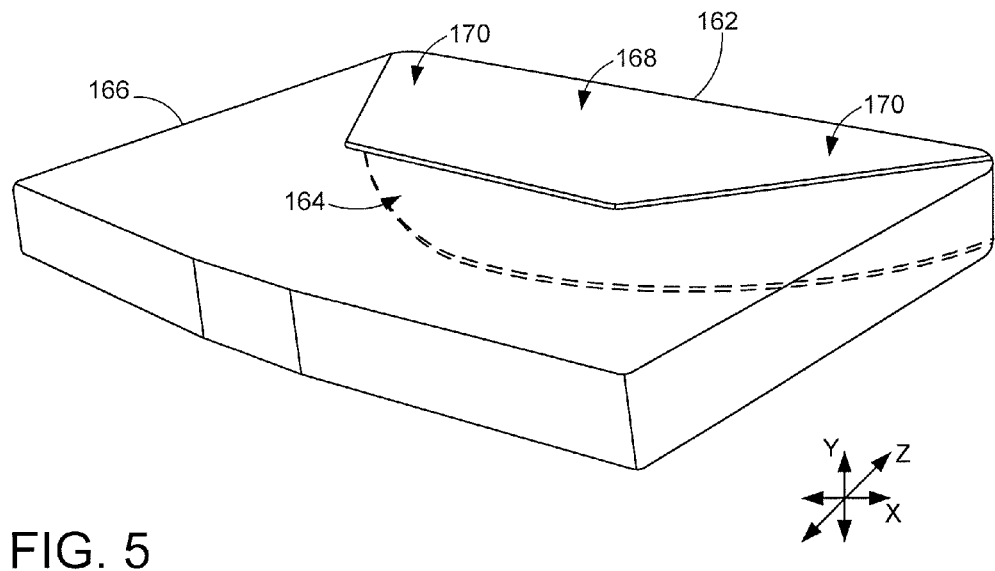
FIG. 5 is an isometric view of an example magnetic data writer.

FIG. 5 provides another example data write yoke 160 that further illustrates the ability to tune first and second stabilization layers 162 and 164 to promote magnetic domain closure. The first stabilization layer 162 is formed as a trapezoid and coupled to a top surface of the yoke body 166 while the second stabilization layer 164 is formed as a semi-circle and couple to a bottom surface of the body 166, directly underneath the first stabilization layer 162. In contrast to the stabilization layers 54 and 156 of FIG. 4, the stabilization layer 162 and 164 are set to provide pinned magnetizations for the same region of the yoke body 166.

With the position of the first and second stabilization layers 162 and 164 on the same portion of the yoke body 166, the pinned magnetizations may combine with opposing magnetization directions to impart greater domain control than a single stabilization layer can provide. Various embodiments can manipulate the thickness of the stabilization layers 162 and 164 to tune the strength of the pinned magnetization, but such configuration can be done or individual portions or an entire stabilization layer. For example, a core portion 168 of the first stabilization layer 162 can have a greater thickness, as measured along the Y axis, than wing portions 170 of the layer 162.

Figure 6:
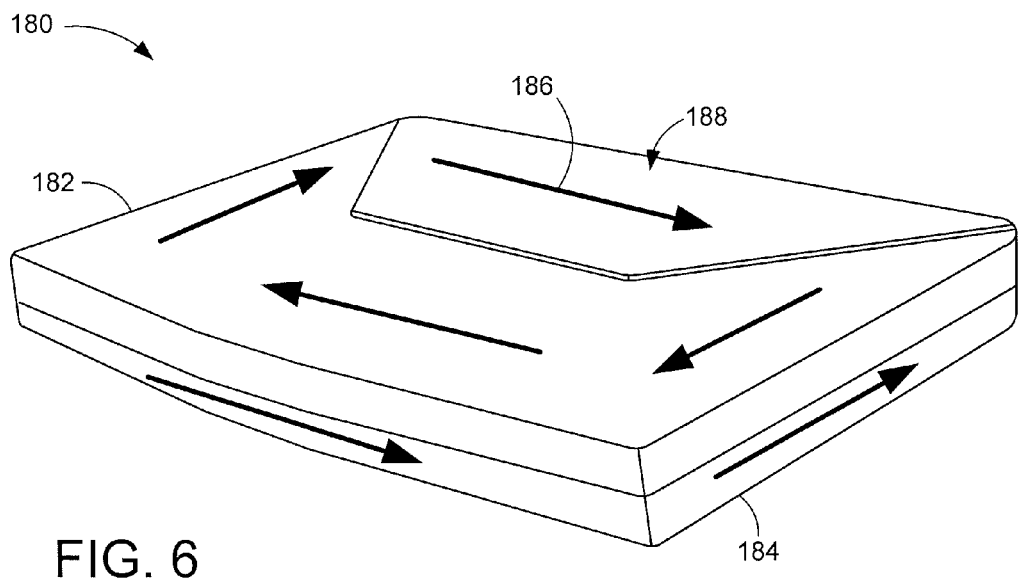
FIG. 6 generally illustrates an isometric view of an example magnetic writing elements constructed in accordance with various embodiments.

Tuning of the yoke 160 is not limited just to the stabilization layers 162 and 164. FIG. 6 shows an example data writer yoke 180 configured with dual body layers 182 and 184 in accordance with various embodiments. Each body layer 182 and 184 be constructed of a continuous film that may or may not have common material composition and magnetic properties. With the embodiment shown in FIG. 6, the body layers 182 and 184 are exchange coupled to produce a greater number of magnetic domains 186 than when the yoke body is a single continuous layer.

By tuning the yoke 180 with dual body layers 182 and 184, the tuned configuration of a stabilization layer 188 may differ from the layers illustrated in FIGS. 3A-5. That is, the elevated number of magnetic domains localized on opposite sides of the yoke 180 may be taken into consideration when tuning the stabilization layer's thickness, material, shape, and position.

Figure 7:
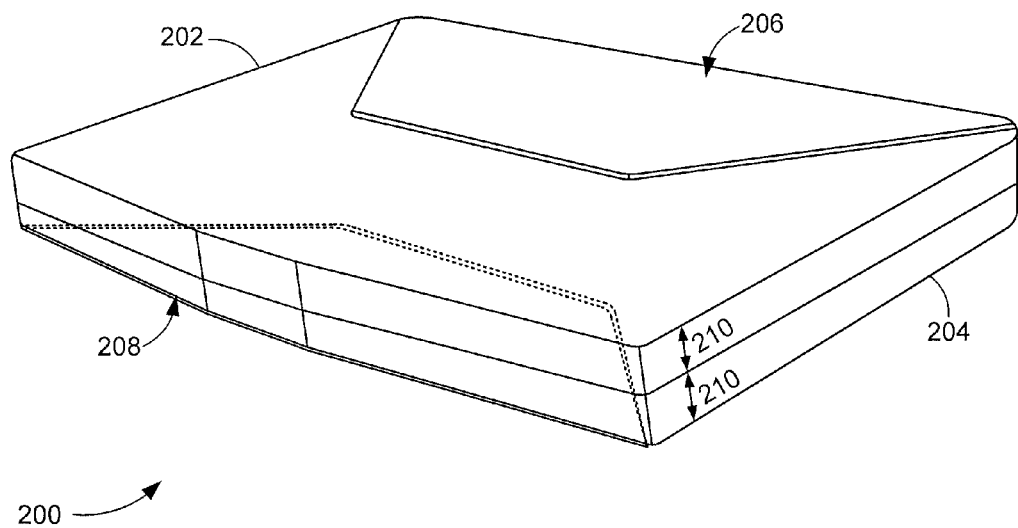
FIG. 7 shows an isometric view of an example magnetic data writer.

FIG. 7 provides an isometric view of anther data writer yoke 200 that has undergone stabilization layer tuning in accordance with various embodiments. The yoke 200 has first and second continuous yoke layers 202 and 204 that respectively have stabilization layers 206 and 208 configured to promote closure domain and more rapidly relax magnetization emission from a connected write pole.

As shown, each yoke layer 202 and 204 has a first common thickness 210 while each stabilization layer 206 and 208 has a second common thickness. Control of the magnetic domains of the respective yoke layers 202 and 204 can be achieved by any number of unlimited stabilization layer tuned configurations. In FIG. 7, each stabilization layer 206 and 208 tuned to be a common shape, size, and antiferromagnetic material. Such configuration can produce antiferromagnetic exchange coupling between the stabilization layers 206 and 208 and the respective yoke layers 202 and 204. However, some embodiments dispose a seed layer, such as Ru and Ta, between the yoke layer and stabilization layer to provide RKKY coupling. Other embodiments combine the seed layer with a dusting of conductive material such as CoFe, to ensure strong antiferromagnetic coupling.

The common tuned configurations of the stabilization layers 206 and 208 may be chosen due to the presence of dual yoke layers 202 and 204, which correspond with separate Landau closure domains. As such, the stabilization layers 206 and 208 may more harmoniously act in concert to control remnant magnetization in the dual yoke layers 202 and 204 if the stabilization layers 206 and 208 are tuned substantially similarly. However, such tuning is not required and in some embodiments the stabilization layers 206 and 208 have considerably different structural and magnetic configurations.

The ability to tune the yoke body and stabilization layer(s) allows for a multitude of possible configurations that can be formed in a variety of fabrication manners, none of which are required or limited. FIG. 7 provides an example data writing element fabrication routine 220 performed in accordance with various embodiments to tune a writing yoke to deter metastable magnetic states and promote closure domains. The routine 220 begins by determining the configuration of the yoke in step 222. The evaluation undertaken in step 222 may result in an unlimited variety of yoke configurations that can relate to any number of characteristics, such as number of yoke layers, material, width, and thickness.

With the yoke designed in step 222, step 224 then forms the yoke with the predetermined configuration. Next, decision 226 determines if antiferromagnetic coupling is to be employed to connect at least one stabilization layer to the yoke. If no antiferromagnetic coupling is to be used, step 228 then chooses the stabilization layer configurations, which has an unlimited number of characteristics to evaluate and determine, such as, but not limited to, number of stabilization layers, layer thickness, material, size, and shape. The resultant stabilization design is subsequently implemented in step 230 with the formation of the stabilization layer(s) in accordance with the predetermined design.

In the event antiferromagnetic coupling is to be used, step 232 deposits a seed layer onto the yoke to allow the growth of the stabilization layer(s). Step 232 may further dust a conductive compound onto the seed layer to further ensure strong antiferromagnetic coupling, but such additional dusting is not required. The deposition of the seed layer advances the routine to the design of the stabilization layer(s) in step 228 and the formation of the design in step 230.

Figure 8:
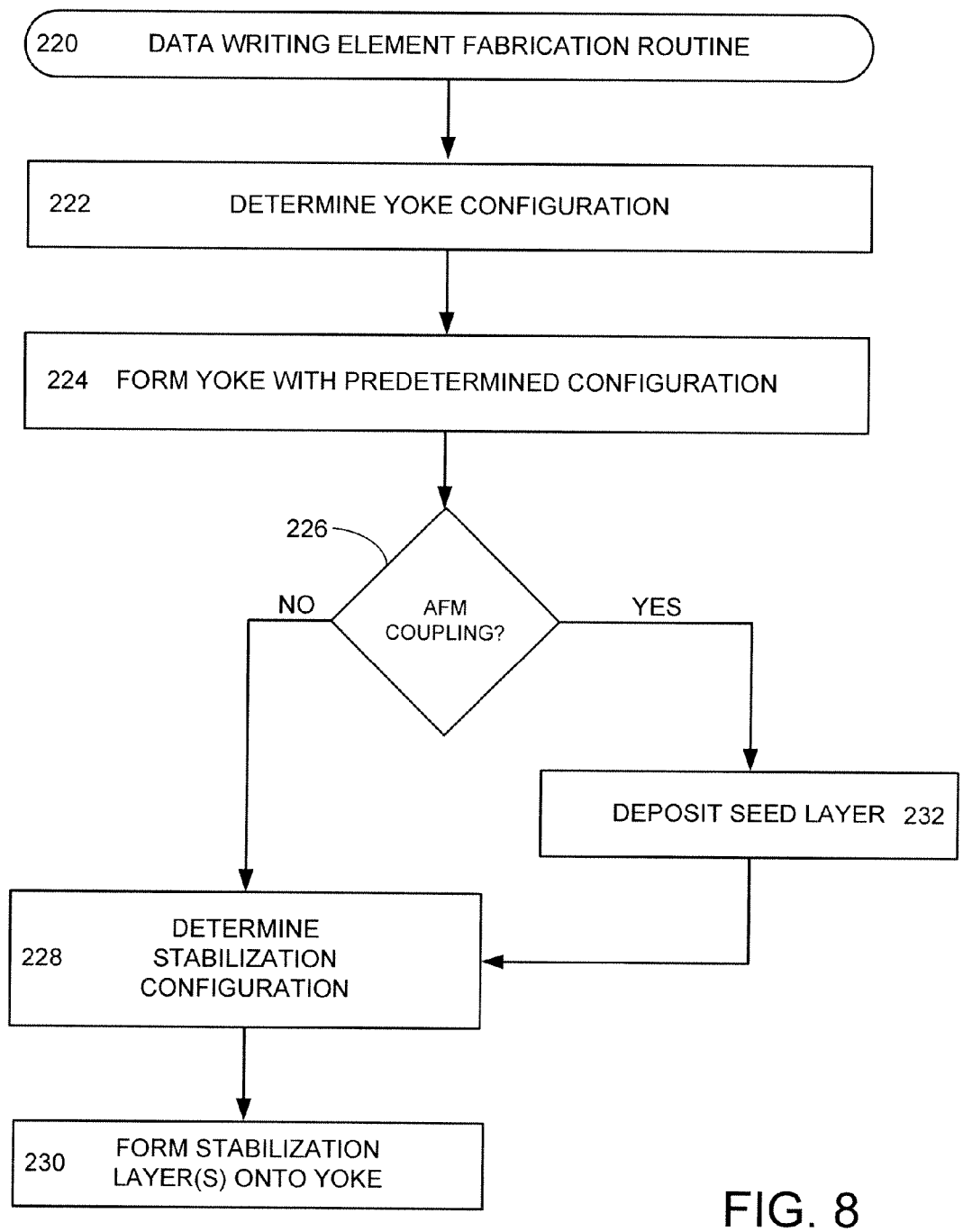
FIG. 8 provides a flowchart of a magnetic writing element fabrication routine conducted in accordance with various embodiments of the present invention.

By tuning the configuration of the yoke and stabilization layer(s), routine 220 can fabricate a data writing element with predetermined magnetic characteristics conducive to one or more Landau closure domains. However, the routine 220 is not limited to the process shown in FIG. 8 as the various decisions and steps can be omitted, changed, and added. For example, decision 226 and step 228 can be conducted collectively with step 222 so that the data writing element is fully designed prior to the deposition of any components.

It can be appreciated that the configuration and material characteristics of the magnetic data writing element described in the present disclosure allows for enhanced magnetic programming by reducing the risk of unwanted magnetic domain configurations in a write yoke and write pole. Moreover, the ability to tune the various layers of a data writing element allows for quickened magnetic relaxation to closure domain, which can correspond to reduced erasure after writing in high areal density data storage devices. In addition, while the embodiments have been directed to magnetic programming, it will be appreciated that the claimed technology can readily be utilized in any number of other applications, such as data sensing and solid state data storage applications.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A data writer comprising a write pole coupled to a yoke having a yoke length and perpendicular yoke width, a stabilizing layer positioned on a common surface of the yoke with the write pole to stabilize magnetic domains present in the yoke, the stabilizing layer separated from the write pole, the stabilizing layer separated from an air bearing surface and having a trapezoidal shape with a pair of parallel sides connected by first and second non-parallel sides defining a stabilizing length as measured parallel to the yoke length and perpendicular to a stabilizing width, the yoke length being greater than the stabilizing length.

2. The data writer of claim 1, wherein the stabilizing layer comprises a permanent magnet.

3. The data writer of claim 1, wherein the stabilizing layer comprises an antiferromagnet.

4. The data writer of claim 3, wherein the yoke comprises a lamination of layers.

5. The data writer of claim 1, wherein the stabilizing layer has a common thickness.

6. The data writer of claim 1, wherein the stabilizing layer and write pole are each coupled to a common surface of the yoke.

7. The data writer of claim 1, wherein the stabilizing layer is centered about and separated from the write pole.

8. The data writer of claim 1, wherein the stabilizing layer continuously extends across a rear edge of the yoke, the rear edge distal to the write pole.

9. The data writer of claim 1, wherein the yoke has a greater width than the write pole.

10. The data writer of claim 1, wherein the yoke stabilizes magnetic domains by reaching a closure domain.

11. A magnetic writing element comprising a write pole coupled to a yoke having a yoke length and a perpendicular yoke width and comprising first and second layers, a first stabilizing layer positioned on a common surface of the first layer with the write pole to stabilize magnetic domains present in the yoke, the stabilizing layer separated from the write pole and an air bearing surface, the stabilizing layer having a trapezoidal shape with a pair of parallel sides connected by first and second non-parallel sides defining a stabilizing length as measured parallel to the yoke length and perpendicular to a stabilizing width, the yoke length being greater than the stabilizing length.

12. The magnetic writing element of claim 11, wherein the first and second layers have substantially matching thicknesses and shapes that form a yoke stack.

13. The magnetic writing element of claim 11, wherein the second layer has a second stabilizing layer positioned thereon.

14. The magnetic writing element of claim 13, wherein the first and second stabilizing layers have a common shape.

15. The magnetic writing element of claim 13, wherein the first and second stabilizing layers are positioned on opposite edges of the first and second layers, respectively.

16. The magnetic writing element of claim 15, wherein the first and second layers are antiferromagnetically coupled.

17. An apparatus comprising:
    a write pole coupled to a yoke, the yoke having a yoke length and perpendicular yoke width; and
    a means for stabilizing the yoke positioned on a common surface of the yoke with the write pole, the means for stabilizing the yoke separated from the write pole and an air bearing surface and having a trapezoidal shape with a pair of parallel sides connected by first and second non-parallel sides.

18. The apparatus of claim 17, wherein the means for stabilizing the yoke comprises first and second layers that respectively have first and second stabilizing layers configured to stabilize magnetic domains present in the yoke.

19. The apparatus of claim 18, wherein the second stabilizing layer is positioned on a front edge of the second layer, proximal the write pole, the first stabilizing layer positioned on a rear edge of the first layer, distal the write pole.

20. The apparatus of claim 17, wherein the means for stabilizing the yoke comprises RKKY coupling between a stabilization layer and the yoke.

* * * * *